No. 767,472. PATENTED AUG. 16, 1904.
J. BEECH.
METHOD OF SOLDERING ARMATURE LEADS TO COMMUTATOR BARS.
APPLICATION FILED OCT. 22, 1902.
NO MODEL.
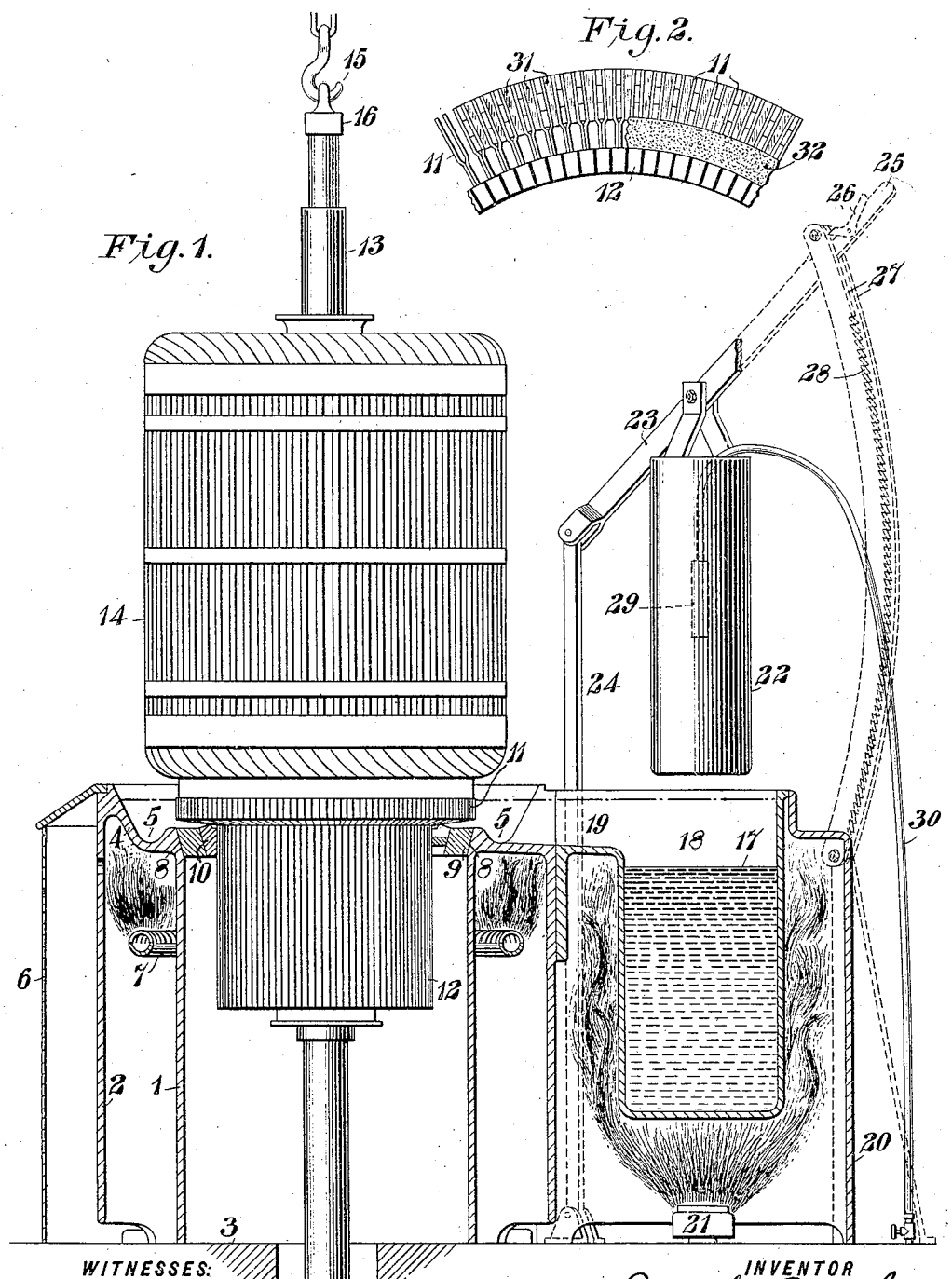
WITNESSES:
C. L. Belcher
Birney Hines
INVENTOR
Jacob Beech
BY Wesley S. Carr
ATTORNEY.

No. 767,472.  
Patented August 16, 1904.

UNITED STATES PATENT OFFICE.

JACOB BEECH, OF WILKINSBURG, PENNSYLVANIA, ASSIGNOR TO WESTINGHOUSE ELECTRIC & MANUFACTURING COMPANY, A CORPORATION OF PENNSYLVANIA.

METHOD OF SOLDERING ARMATURE-LEADS TO COMMUTATOR-BARS.

SPECIFICATION forming part of Letters Patent No. 767,472, dated August 16, 1904.

Application filed October 22, 1902. Serial No. 128,360. (No model.)

*To all whom it may concern:*

Be it known that I, JACOB BEECH, a citizen of the United States, and a resident of Wilkinsburg, in the county of Allegheny and State of Pennsylvania, have invented a new and useful Improvement in Methods of Soldering Armature-Leads to Commutator-Bars, of which the following is a specification.

My invention relates to the manufacture of electric generators and motors, and particularly to that portion of the manufacture which consists in soldering the armature-leads to the necks of the commutator-bars.

The object of my invention is to provide a method which may be easily practiced and which shall effect a considerable economy in time, labor, and materials and also insure a product which shall be more satisfactory and desirable than has been possible by the methods heretofore employed.

Suitable apparatus for practicing my invention is shown in the accompanying drawings, in which—

Figure 1 is a view, partially in side elevation and partially in section, of an armature and its commutator in position for applying solder to the assembled armature-leads and commutator-necks and apparatus for applying the solder thereto; and Fig. 2 is an end elevation of a portion of an open-neck commutator and certain devices which are employed in connection therewith in practicing my method.

My invention is not limited to the use of any specific apparatus, that shown being, however, such as I have found satisfactory in practice.

In describing my method I shall for convenience refer to the apparatus illustrated as if its use were intimately connected with the method; but it will of course be understood that any operative means for applying molten solder to all of the combined armature-leads and commutator-necks simultaneously may be employed.

The apparatus shown in Fig. 1 of the drawings, which will now be described, comprises a frame, here shown as having two concentric cylindrical shells 1 and 2, which rest upon a suitable floor or base 3 and which are connected at their upper ends by a web 4 of such form as to provide an annular basin 5, the outer edge of which is considerably higher than the inner edge. The two shells 1 and 2 and the web 4 are shown as integral parts of a single casting; but this construction is obviously not vitally essential. The shell 2 is shown as nearly surrounded by a casing 6, and between the two shells 1 and 2 is located a gas-burner 7, the purpose of which will be readily understood, but which will be hereinafter more specifically referred to.

The inner wall of the web 4 is provided with a tapering or inclined surface 8, against which is fitted a master-ring 9, having an inclined or tapering inner surface. Within the master-ring 9 is fitted a ring 10, the inner diameter of which corresponds to the outer diameter of the commutator, to the necks of which the solder is to be applied. As indicated, the necks 11 of the commutator-bars 12 rest upon the ring 10, and the commutator-body and the corresponding end of the shaft project down into the interior of the cylinder 1. The armature 14 and its shaft and commutator may be placed in the position shown by means of a suitable crane, the lifting-hook 15 of which is connected to one end of the shaft 13 by any suitable connecting device 16.

The solder 17 to be applied to the commutator-necks 11 is contained in a pot 18, between which and the basin 5 is a channel 19, having a bottom that is slightly inclined downwardly from the basin to the pot, and the latter is surrounded by a casing 20, within which is a flame for maintaining the solder in a molten condition. This flame, as shown, is supplied by a gas-burner 21, which is located below the pot 18. In order to cause the molten solder to flow to and from the basin 5, I provide a plunger 22 and suspend it from a lever 23, one end of which is pivotally supported by a rod or bar 24 and the other end of which has a handle 25 and a pawl 26. The bar 23 extends between two parallel grooved arms 27, one of which is provided with ratchet-teeth 28 in position to be engaged by the pawl 26, so that the plunger may be lowered notch by notch and fastened in any position desired in order to secure the desired level of molten solder in the basin 5. The plunger 22 is shown in an artificial position, which may be maintained only by the operator or by a temporary supporting device, that is not shown in the drawings. The pawl 26 and ratchet-teeth 28 are employed solely to lock the plunger in the various positions to which it may be adjusted against the upward pressure of the molten solder when partially submerged therein.

The plunger 22 may be heated before it is inserted into the molten solder in the pot 18, if desired, by means of a gas-burner 29, located in a cavity therein and supplied with gas through a flexible pipe 30, though this is not an essential feature of the method.

It will be understood that the parts to be soldered—that is to say, the ends of the armature-leads and the portions of the commutator-necks to which said ends are to be mechanically attached—are first tinned, and then the said parts are assembled in proper relation. The armature is then placed in the position indicated in the drawings and allowed to remain in that position until the flame from the burner 7 has raised the temperature of the parts to be soldered, and also the surrounding portions of the apparatus, to the proper temperature for insuring the desired union between the solder and the tinned parts. When this temperature has been attained, the plunger 22 is depressed into the body of molten solder 17, thus forcing a portion of the same through the channel 19 into the basin 5 until the portions to be soldered are substantially submerged in the molten solder. The apparatus is then permitted to stand a few moments until the solder has penetrated the spaces between the armature-leads and the adjacent portions of the necks, and then the plunger is raised to permit the surplus solder to flow back from the basin 5 into the pot 18, and the armature is removed, another substituted, and the operation above described repeated.

If the commutator-necks are separated by solid insulation only, the apparatus above described is all that is necessary for practicing the method; but if adjacent necks are separated by air-spaces it may be desirable to insert temporary wedges 31 in said spaces and to cover such portions of the spaces as are not filled by said wedges by a ring 32, of asbestos or other refractory material, in order to exclude the solder from those parts which are not intended to be directly united, as I have indicated in Fig. 2.

As has already been suggested, the parts to be soldered may be submerged in molten solder by the use of means different from what is shown, if found desirable or convenient, and it will also be understood that the invention may be applied to other apparatus than that here illustrated and specifically described, since the invention is applicable to soldering a number of parts simultaneously and effectively irrespective of the particular use to which they may be subsequently applied.

I claim as my invention—

1. The method of soldering armature-leads to the necks of commutator-bars which consists in first applying heat to the assembled leads and necks, then subjecting them simultaneously to a bath of molten solder and at the same time maintaining the applied heat and finally withdrawing the surplus solder without disturbing the soldered structure.

2. The method of soldering armature-leads to the necks of commutator-bars which consists in first heating the assembled parts, then applying a body of molten solder to all of said parts simultaneously without interrupting the heat or changing the location of said parts and finally withdrawing the surplus solder without disturbing the soldered structure.

3. The method of soldering armature-leads to commutator-bars which consists in first heating the parts to be soldered, then subjecting all the parts to be soldered simultaneously to a bath of molten solder and at the same time maintaining the applied heat and finally removing the surplus solder without disturbing the soldered structure.

4. The method of soldering a number of mechanically-combined parts which consists in primarily heating them and then simultaneously submerging them in molten solder without interrupting the applied heat and without changing their location, maintaining said condition until the solder effects the desired union and then withdrawing the surplus solder without disturbing the soldered structure.

In testimony whereof I have hereunto subscribed my name this 18th day of October, 1902.

JACOB BEECH.

Witnesses:
  GEO. L. DOBERNECK,
  JAMES B. YOUNG.